US009871247B2

(12) United States Patent
Burshtain et al.

(10) Patent No.: US 9,871,247 B2
(45) Date of Patent: *Jan. 16, 2018

(54) GERMANIUM-CONTAINING ACTIVE MATERIAL FOR ANODES FOR LITHIUM-ION DEVICES

(71) Applicant: StoreDot Ltd., Herzeliya (IL)

(72) Inventors: Doron Burshtain, Rehovot (IL); Ronny Costi, Rehovot (IL); Carmit Ophir, Holon (IL); Daniel Aronov, Netanya (IL)

(73) Assignee: StoreDot Ltd., Herzeliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/271,234

(22) Filed: Sep. 21, 2016

(65) Prior Publication Data

US 2017/0012279 A1 Jan. 12, 2017

Related U.S. Application Data

(62) Division of application No. 14/926,012, filed on Oct. 29, 2015, now Pat. No. 9,472,804.

(Continued)

(51) Int. Cl.
*H01M 4/587* (2010.01)
*H01M 4/38* (2006.01)
(Continued)

(52) U.S. Cl.
CPC .............. *H01M 4/38* (2013.01); *H01G 11/06* (2013.01); *H01G 11/08* (2013.01); *H01G 11/50* (2013.01);
(Continued)

(58) Field of Classification Search
CPC ...... H01M 4/364; H01M 4/587; H01M 4/386; H01M 4/38; H01M 10/0525; H01G 11/50; H01G 11/74
See application file for complete search history.

(56) References Cited

U.S. PATENT DOCUMENTS 3,778,254 A  12/1973  Cole et al.
7,192,673 B1 *  3/2007  Ikeda ................ H01M 4/13
                                                    429/209
(Continued)

OTHER PUBLICATIONS

Kennedy et al. "Nanowire Heterostructures Comprising Germanium Stems and Silicon Branches as High-Capacity Li-Ion Anodes with Tunable Rate Capability" ACS Nano 2015 9 (7), 7456-7465.*

(Continued)

*Primary Examiner* — Patrick Ryan
*Assistant Examiner* — Kiran Akhtar
(74) *Attorney, Agent, or Firm* — Pearl Cohen Zedek Latzer Baratz LLP

(57) ABSTRACT

Active materials for anodes for lithium ion devices are disclosed. An active may comprise germanium nano-particles having a particle size of 20 to 100 nm, wherein the weight percentage of the germanium is between 72 to 96 weight % of the total weight of the active material; boron carbide nano-particles having a particle size of 20 to 100 nm, wherein the weight percentage of boron in the active material is between 3 to 6 weight % of the total weight of the active material; and tungsten carbide nano-particles having a particle size of 20 to 60 nm, wherein the weight percentage of tungsten in the active material is between 6 to 25 weight % of the total weight of the active material.

3 Claims, 3 Drawing Sheets

Related U.S. Application Data

(60) Provisional application No. 62/081,043, filed on Nov. 18, 2014.

(51) Int. Cl.

| | | |
|---|---|---|
| H01M 4/36 | (2006.01) | |
| H01M 10/0525 | (2010.01) | |
| H01M 4/133 | (2010.01) | |
| H01M 4/134 | (2010.01) | |
| H01G 11/06 | (2013.01) | |
| H01G 11/08 | (2013.01) | |
| H01G 11/50 | (2013.01) | |
| H01G 11/52 | (2013.01) | |
| H01G 11/56 | (2013.01) | |
| H01G 11/58 | (2013.01) | |
| H01M 2/16 | (2006.01) | |
| H01M 4/136 | (2010.01) | |
| H01M 4/62 | (2006.01) | |
| H01M 10/0565 | (2010.01) | |
| H01M 10/0569 | (2010.01) | |
| H01G 11/74 | (2013.01) | |
| H01M 4/02 | (2006.01) | |

(52) U.S. Cl.
CPC ............ *H01G 11/52* (2013.01); *H01G 11/56* (2013.01); *H01G 11/58* (2013.01); *H01G 11/74* (2013.01); *H01M 2/1653* (2013.01); *H01M 4/133* (2013.01); *H01M 4/134* (2013.01); *H01M 4/136* (2013.01); *H01M 4/364* (2013.01); *H01M 4/386* (2013.01); *H01M 4/587* (2013.01); *H01M 4/622* (2013.01); *H01M 4/623* (2013.01); *H01M 4/625* (2013.01); *H01M 10/0525* (2013.01); *H01M 10/0565* (2013.01); *H01M 10/0569* (2013.01); *H01M 2004/027* (2013.01); *H01M 2220/20* (2013.01); *H01M 2220/30* (2013.01)

(56) References Cited

U.S. PATENT DOCUMENTS

| | | | | |
|---|---|---|---|---|
| 9,472,804 | B2 * | 10/2016 | Burshtain | ............ H01M 4/133 |
| 2002/0146623 | A1 * | 10/2002 | Suzuki | ................. H01M 4/134 |
| | | | | 429/218.1 |
| 2004/0219428 | A1 | 11/2004 | Nagayama | |
| 2009/0179181 | A1 * | 7/2009 | Zhang | ...................... H01B 1/16 |
| | | | | 252/503 |
| 2010/0190059 | A1 * | 7/2010 | Graetz | ................. H01M 4/134 |
| | | | | 429/231.95 |
| 2011/0257001 | A1 | 10/2011 | Negishi | |
| 2013/0040226 | A1 | 2/2013 | Yamauchi et al. | |
| 2013/0260285 | A1 | 10/2013 | Yamauchi et al. | |

OTHER PUBLICATIONS

Tadhg Kennedyet al. "Nanowire Heterostructures Comprising Germanium Stems and Silicon Branches as High-Capacity Li-Ion Anodes with Tunable Rate Capability" ASC NANO Published online 10.1021/ascnano.5b02528.

Xiaojun Wu et al. "Hydrogen Storage in Pillared Li-Dispersed Boron Carbide Nanotubes" J. Phys. Chem. C 2008, 112, pp. 8458-8463; Revised Manuscript: Mar. 18, 2008.

D. R. Secrist "Compound Formation in the Systems Lithium-Carbon and Lithium-Boron" Journal of the American Ceramic Society vol. 50, No. 10 pp. 520-523.

Naoki Suzuki et al. "Silicon nitride thin film electrode for lithium-ion batteries" Journal of Power Sources 231 (2013) pp. 186-189.

Li-Feng Cui et al. "Carbon-Silicon Core-Shell Nanowires as High Capacity Electrode for Lithium Ion Batteries" Nano Letters 2009; vol. 9, No. 9 pp. 3370-3374; Revised Manuscript Jul. 2, 2009.

Bin Wang et al. "The Dimensionality of Sn Anodes in Li Ion Batteries" Materials Today Dec. 2012 | vol. 15 | No. 12 pp. 544-552.

Jee Ho Yom et al. "Improved electrochemical behavior of Tungsten coated Silicon monoxide-Carbon composite anode in lithium ion battery" Abstract #1041, 224th ECS Meeting, © 2013 The Electrochemical Society.

European Search Report from European Application No. EP 15 19 2846 dated Jan. 12, 2016.

U.S. Office Action for U.S. Appl. No. 14/926,012 dated Apr. 21, 2016.

Office action of EP Patent Application No. 15192846.2, dated May 30, 2017.

* cited by examiner

GERMANIUM-CONTAINING ACTIVE MATERIAL FOR ANODES FOR LITHIUM-ION DEVICES

CROSS REFERENCE TO RELATED APPLICATIONS

This Application is a divisional Patent Application of U.S. patent application Ser. No. 14/926,012, filed on Oct. 29, 2015, now allowed, which claims the benefit of U.S. Provisional Application Ser. No. 62/081,043, filed on Nov. 18, 2014 and entitled "COMPOUNDS FOR BATTERY ELECTRODES, ENERGY-STORAGE DEVICES, AND METHODS THEREIN", both of which are incorporated in their entirety herein by reference.

BACKGROUND OF THE INVENTION

The present disclosure relates to electrode active materials used in lithium ion devices, such as rechargeable lithium ion batteries.

Lithium ion batteries, also known as Li-ion Batteries or LIB's are widely used in consumer electronics, for example in mobile telephones, tablets and laptops. LIB's are also used in other fields, such as military uses, electric vehicles and aerospace applications. During discharge of the battery, lithium ions (Li-ions) travel from a high-energy anode material through an electrolyte and a separator to a low-energy cathode material. During charging, energy is used to transfer the Li-ions back to the high-energy anode assembly. The charge and discharge processes in batteries are slow processes, and can degrade the chemical compounds inside the battery over time. Rapid charging causes accelerated degradation of the battery constituents, as well as a potential fire hazard due to a localized, over-potential build-up and increased heat generation—which can ignite the internal components, and lead to explosion.

Typical Li-ion battery anodes contain mostly graphite. Silicon or germanium, as anode-alloying components, generally exhibit higher lithium absorption capacities in comparison to anodes containing only graphite. Such silicon-containing or germanium-containing electrodes, however, usually exhibit poor life cycle and poor coulombic efficiency due to the mechanical expansion of silicon and germanium upon alloying with lithium, and upon lithium extraction from the alloy, which reduce the silicon alloy volume. Such mechanical instability results in the material breaking into fragments.

SUMMARY OF THE INVENTION

Some embodiments of the invention may be directed to lithium-ion devices and in particular to anodes for lithium-ion devices. An anode material for a lithium ion device according to some embodiments of the invention may include an active material including germanium and boron. In some embodiments, the weight percentage of the germanium may be between about 5 to 80 weight % of the total weight of the anode material and the weight percentage of the boron may be between about 2 to 20 weight % of the total weight of the anode material. In some embodiments, the weight percentage of the germanium may be between about 60 to about 75 weight % of the total weight of the anode material and the weight percentage of the boron may be between about 3 to about 6 weight % of the total weight of the anode material.

An active material for producing anodes for Li-ion devices may include germanium at a weight percentage of about between 6.5 to 94 weight % of the total weight of the active material and boron at a weight percentage of about between 1.5 to 15 weight % of the total weight of the active material. In some embodiments, the active material may include carbon. In some embodiments, the active material may further include tungsten at a weight percentage of between about 6 to about 25 weight % tungsten of the total weight of the active material.

Some embodiments of the invention may be directed to a lithium ion device. The lithium ion device may include an anode having an active material comprising germanium and boron. In some embodiments, the weight percentage of the germanium may be between about 5 to 80 weight % of the total weight of the anode and the weight percentage of the boron may be between about 2 to 20 weight % of the total weight of the anode. The lithium ion device may further include a cathode and an electrolyte.

Some embodiments of the invention may be directed to a method for making an anode material for a lithium ion device. The method may include forming an alloy from germanium powder, carbon, and a boron-containing compound to form an active material, and adding the active material to a matrix to form the anode material. In some embodiments, the weight percentage of the germanium is between about 5 to about 80 weight % of the total weight of the anode material and the weight percentage of the boron is between about 2 to about 20 weight % of the total weight of the anode material.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
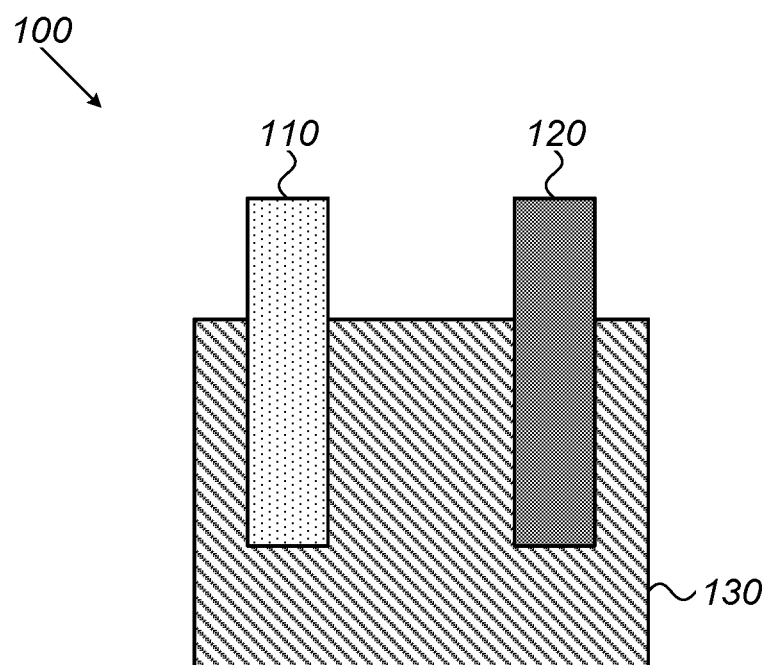
FIG. 1 is an illustration of an exemplary lithium ion device according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the invention describe anodes for lithium ion devices, an active material (anode intercalation compounds) for manufacturing the anodes and the lithium ion devices. The term active material refers herein to an alloying material that is chemically active with lithium ions. The lithium ion devices may include lithium ion batteries (Li-ion battery or LIB), Li-ion capacitors (LIC), Li-ion hybrid system including both a battery and a capacitor or the like.

The active material may include an alloy comprising graphite (C), germanium (Ge) and boron (B). The carbon, germanium and boron may be milled together to form an alloy. Other methods for forming alloys may be used. In some embodiments, the active material may further include silicon (Si) and tungsten (W) in the form of tungsten carbide (WC) particles. In some embodiments, the active material may include an alloy comprising graphite (C), germanium (Ge) and tungsten (W). As used herein, "alloy" includes an intimate mixture of metal powders, as described above.

According to embodiments of the invention, the composition of the anode may comprise an active anode material as detailed herein, a binder and/or plasticizer (e.g. polyvinylidene fluoride (PVDF)) and a conductive agent (e.g. carbon black and carbon-nano-tubes (CNT)).

According to some embodiments, the weight percentage of the germanium may be between about 5 to 80 weight % of the total weight of the anode material and the weight percentage of the boron may be between about 2 to 20 weight % of the total weight of the anode material. According to other embodiments, the anode material may further include tungsten. The percentage of the tungsten may be between about 2 to 20 weight % of the total weight of the anode material.

In some embodiments, the weight percentage of the germanium may be between about 60 to 75 weight % of the total weight of the anode material, the weight percentage of the boron may be between about 3 to 6 weight % of the total weight of the anode material. The weight percentage of the carbon (in the form of graphite) within the active material may be between about 0.5 to 5 weight % of the total weight of the anode material. In some embodiments, the weight percentage of the tungsten may be between 7 to about 11 weight % of the total weight of the anode material.

In some embodiments, the active material within the anode material may further include silicon. The amount of silicon is added such that the weight ratio between the germanium and the silicon is at least 4 to 1, for example, 5 to 1, 6 to 1 or more. An exemplary anode material having 60 weight % germanium of the total weight of the anode material may include 12 weight % silicon of the total weight of the anode material.

According to the present invention, there is provided a compound for forming electrodes, the compound including: (a) a general formula of $Ge_xSi_yC_pB_qW_zN_r$, wherein x, y, p, q, z, and r represent normalized weight ratios in which approximately $0.1 \leq x \leq 1$, $0 \leq y \leq 0.20$, $0 \leq q \leq 0.20$, $0 \leq z \leq 0.20$, $|q-z|>0$, $0 \leq r \leq 0.10$, and $x+y+q+p+z+r=1.00$. Preferably, wherein q>0 and z=0. Most preferably, wherein r=0. Preferably, wherein q=0 and z>0. Most preferably, wherein r=0. Preferably, wherein q=0 and z>0. Most preferably, wherein r=0. Preferably, wherein q>0 and z>0. Most preferably, wherein r=0.

Preferably, the compound further includes: (b) micro-particles and/or nano-particles, wherein the micro-particles and/or the nano-particles are particles of at least one type selected from the group consisting of: amorphous, crystalline, polycrystalline, any physical form of the formula, a metal carbide of the formula, a metal borat, boron, an organometallic compound, and a pre-prepared alloy of the formula in any physical form.

Reference is made to FIG. 1, illustrating an exemplary lithium ion device according to some embodiments of the invention. A lithium ion device 100 may include an anode 110 as detailed herein, a cathode 120 and an electrolyte 130 suitable for lithium ion devices. A non-limiting list of exemplary lithium ion devices may be Li-ion batteries, Li-ion capacitors and Li-ion hybrid system including both a battery and a capacitor. Electrolyte 130 may be in the form of a liquid, solid or gel. Examples of solid electrolytes include polymeric electrolytes such as polyethylene oxide, fluorine-containing polymers and copolymers (e.g., polytetrafluoroethylene), and combinations thereof. Examples of liquid electrolytes include ethylene carbonate, diethyl carbonate, propylene carbonate, fluoroethylene carbonate (FEC), and combinations thereof. The electrolyte may be provided with a lithium electrolyte salt. Examples of suitable salts include $LiPF_6$, $LiBF_4$, lithium bis(oxalato)borate, $LiN(CF_3SO_2)_2$, $LiN(C_2F_5SO_2)_2$, $LiAsF_6$, $LiC(CF_3SO_2)_3$, $LiClO_4$, and LiTFSI. Cathode 120 may include cathode compositions suitable for the use in lithium ion devices. Examples of suitable cathode compositions may include $LiCoO_2$, $LiCo_{0.33}Mn_{0.33}Ni_{0.33}O_2$, $LiMn_2O_4$, and $LiFePO_4$.

In some embodiments, lithium ion device 100 may further include a separator (not illustrated). The separator may be configured to separate between the anode and the cathode. An exemplary separator according to some embodiments of the invention may include poly ethylene (PE), polypropylene (PP) or the like.

Anode 110 according to embodiments of the invention, when incorporated in a lithium ion device, such as battery, exhibits improved cycle-life and coulombic efficiency over common anodes. The mechanical stability of the anode (achieved after the first cycle, or after several initial cycles), and hence of the lithium ion device, is also improved. Such stability is assumed to be attributed to the incorporation of the tungsten and/or boron into the expanding germanium-lithium alloy during the charge-discharge process. Such incorporation may help prevent metallization of the lithium during charging due to the relatively strong lithium-tungsten and/or lithium-boron binding. Such strong binding may result in a partly-charged assembly which may contribute to the enhanced stability and cycle life of the anode.

The presence of boron and/or tungsten may facilitate the electrochemical utilization of the germanium (and the silicon in a Si—Ge anode material), and substantially may reduce the migration of germanium into the electrode substrate. Moreover, boron carbide may enhance the binding energy of Li atoms, (boron's binding energy is greater than the cohesive energy of lithium metal) and may prevent lithium from clustering at high lithium doping concentrations.

Boron carbide, which is inert to oxidation at the anode in the electrochemical reaction, interacts with germanium, germanium oxide and lithium. Lithium ions may react with boron carbide and germanium oxide to form lithium carbide, lithium boride, lithium oxide and mainly lithium tetraborate, thus leaving the Li ions partly charged. Such partial surface charges in Li—Ge—C alloys may stabilize the overall structure externally and/or internally. External stabilization may occur as a result of preventing lithium metallization by keeping the lithium as a tetraborate salt. Internal stabilization may occur as a result of leaving the internal germanium alloy structure with δ+ centers, and hence providing a stable matrix for lithium ion transport inside the germanium structure, during the extraction and insertion of lithium ions.

Tungsten carbide with naturally-occurring germanium oxide-carbon composites may improve the electrochemical behavior of the anode. The tungsten-carbide may act as hydron (H+) ion barrier. Tungsten carbide is highly conductive and inert substance, therefore, may further stabilize the conductivity of the electrode over the life cycle and therefore, may stabilize the conductivity of the electrode.

Preparation of the anode may include milling and/or mixing processes. In some embodiments, a germanium powder and graphite powder may be inserted into a high-energy ball-miller to be milled under protective atmosphere or non-protective atmosphere. In some embodiments, a boron-carbide ($B_4C$) powder may be added to the pre-milled Ge/C mixture inside the miller In some embodiments, Si powder may further be added to the Ge/C mixture inside the miller. The miller may include hardened alumina media that may be agitated at 1000-1500 RPM. The milling stage may produce an alloy having nano-size particles of around 20-100 nm particle size. In some embodiments, an emulsion containing nano-sized tungsten carbide (WC) particles may be added to the as milled powder (Ge/C or Ge/C/B alloy) at the end of the milling process to produce the active material for the anode. The tungsten carbide particle size may be between around 20 to 60 nm. As used herein, "nano-sized" particles means particles having an average particle size less than one micron, in embodiments "nano-sized" means particles having an average particle size less than 100 nm.

The active material for making anodes for Li-ions devices (e.g., device 100), such as batteries may include a germanium-carbon-boron-tungsten alloy, a germanium-carbon-boron alloy, germanium-silicon-carbon-boron alloy or a germanium-carbon-tungsten alloy. Additional polymeric binders and conductive additives may be added to the alloy to form the final anode material. An exemplary anode, according to embodiments of the invention, may include conductive materials at a weight percentage of about between 5 to 10 weight % of the total weight of the anode material and binder material at a weight percentage of about between 0.01 to 5 weight % of the total weight of the anode material. Exemplary conductive elements may include spherical carbon, carbon nano-tubes and/or graphene particles.

In some embodiments, the active material may include a germanium-carbon-boron alloy, in which the weight percentage of the germanium may be between about 6.5 to about 94 weight % of the total weight of the active material, the weight percentage of the boron may be between about 1.5 to about 15 weight % of the total weight of the active material and the weight percentage of the carbon may be between about 6.5 to about 25 weight % of the total weight of the active material. In some embodiments, the active material may further include tungsten and/or silicon. The weight percentage of the tungsten may be between 8-30 weight % of the total weight of the active material and the silicon may be added such that the weight ratio between the germanium and the silicon is at least 4 to 1.

In some embodiments, the active material may include a germanium-carbon-boron-tungsten alloy, in which the weight percentage of the germanium may be between about 72 to about 96 weight % of the total weight of the active material, the weight percentage of the boron may be between about 3 to about 6 weight % of the total weight of the active material, the weight percentage of the carbon may be between about 0.66 to about 6.6 weight % of the total weight of the active material. In some embodiments, when the active material includes tungsten, the weight percentage of the tungsten may be between about 6 to 25 weight % of the total weight of the active material. In some embodiments, the active material may include a germanium-carbon-tungsten alloy, in which the weight percentage of the germanium may be between about 6.5 to about 94 weight % of the total weight of the active material, the weight percentage of the carbon may be between about 0.67 to about 6.7 weight % of the total weight of the active material and the weight percentage of the tungsten may be between about 6 to about 25 weight % of the total weight of the active material.

In some embodiments, the anode material may further include carbon nano-tubes (CNT) at a weight percentage of about between 0.05 to 0.5 weight % of the total weight of the anode. The carbon nano-tubes may replace the tungsten carbide particles or be added to the anode material in addition to the tungsten carbide particles. Accordingly, the alloy material may include between 0.06-0.8 weight % carbon nano-tubes of the total weight of the anode material. An exemplary anode material may include 0.1-0.3 weight % single-rod carbon nano-tubes.

EXAMPLES

Figure 2:
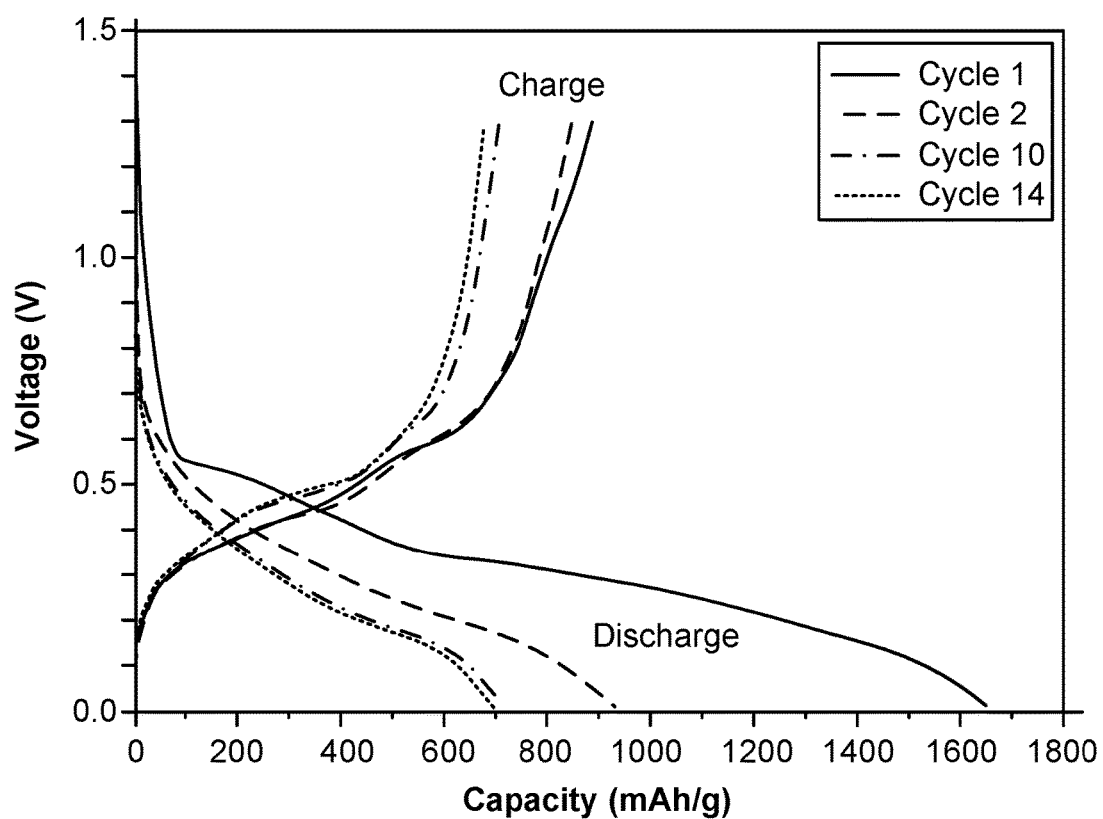
FIG. 2 is a graph presenting first-cycle charge-discharge curves of an exemplary lithium-ion half-cell for a germanium-based anode containing boron and tungsten according to some embodiments of the invention.

Reference is made to FIG. 2 presenting first-cycle charge-discharge curves of an exemplary lithium-ion half-cell for a germanium-based anode containing boron and tungsten according to some embodiments of the invention. The voltage of the half-cell is presented as a function of the charge values in mAh/g. The exemplary anode material included (in weight percentage from the total weight of the anode) 69% Ge, 3% C, 10% W, 5% B, 10% binder and 3% conductive additives ($Ge_{0.69}C_{0.03}W_{0.10}B_{0.050}$ $Binder_{0.1}ConductiveAditive_{0.03}$). The as-milled Ge/C/W/B alloy (i.e. the active material) included 79% Ge, 3% C, 12% W and 6% B weight percent of the total weight of the alloy ($Ge_{0.79}C_{0.03}W_{0.12}B_{0.06}$). Looking at the graphs of FIG. 2, the first charge yielded 1,705 mAh/g, and the discharge produced 913 mAh/g, resulting in a 53.5% first-cycle efficiency. The first-cycle efficiency is defined as the first discharge yield divided by the first charge yield. The first charge capacity is much higher than the theoretical first charge capacity of 1,143 mAh/g known for germanium. This behavior is probably due to the reaction between available lithium ions and boron and/or tungsten, as explained above.

Figure 3:
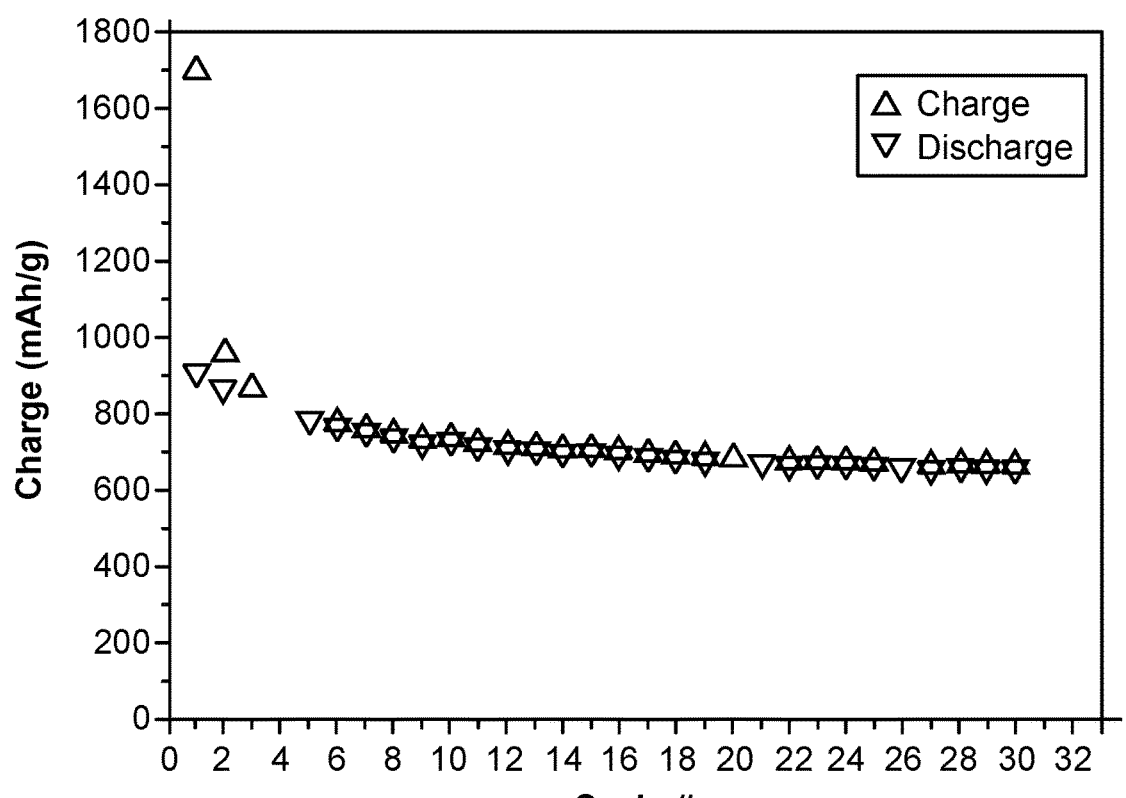
FIG. 3 is a graph presenting charge-discharge graph as a function of the cycle for a germanium-based anode containing boron and tungsten according to some embodiments of the invention.

Reference is made to FIG. 3, presenting charge-discharge graph as a function of the cycle for a germanium-based anode containing boron and tungsten according to some embodiments of the invention. The same type of half-cell with the same anode that was tested to create the graph presented in FIG. 2 was used again in a multi cycle charge-discharge tests. At the first 6 cycles there is a drop in capacitance that may be attributed to the expansion/contraction of the germanium particles. However, already after 7 cycles the anode stabilized, resulting in a very high coulombic efficiency (99%) and a stable cyclic response.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. An active material for producing an anode for a lithium ion device, the active material comprising:
    germanium nano-particles having a particle size of 20 to 100 nm, wherein the weight percentage of the germanium is between 72 to 96 weight % of the total weight of the active material;
    boron carbide nano-particles having a particle size of 20 to 100 nm, wherein the weight percentage of boron in the active material is between 3 to 6 weight % of the total weight of the active material; and
    tungsten carbide nano-particles having a particle size of 20 to 60 nm, wherein the weight percentage of tungsten in the active material is between 6 to 25 weight % of the total weight of the active material.

2. The active material of claim 1, comprises carbon at a weight percentage of between 0.66 to 6.6 weight % of the total weight of the active material.

3. The active material of claim 1, wherein the active material further comprises silicon and a weight ratio of germanium to silicon in the active material is at least 4 to 1.

* * * * *